(12) United States Patent
Lee

(10) Patent No.: US 6,764,594 B2
(45) Date of Patent: Jul. 20, 2004

(54) RESERVOIR FOR REVERSE OSMOSIS TYPE WATER FILTERING SYSTEM

(76) Inventor: Shih-Ping Lee, 6F, No, 200-2, Pei-Tun Rd, Taichung City (TW)

(*) Notice: Subject to any disclaimer, the term of this patent is extended or adjusted under 35 U.S.C. 154(b) by 119 days.

(21) Appl. No.: 10/261,697

(22) Filed: Oct. 2, 2002

(65) Prior Publication Data

US 2004/0065623 A1 Apr. 8, 2004

(51) Int. Cl.[7] .............................. C02F 1/30; C02F 1/78
(52) U.S. Cl. ........................ 210/95; 210/104; 210/205; 222/190
(58) Field of Search ........................... 210/95, 97, 104, 210/121, 205; 422/24, 186, 186.07, 186.3; 222/190

(56) References Cited

U.S. PATENT DOCUMENTS

| | | | | |
|---|---|---|---|---|
| 5,266,215 A | * | 11/1993 | Engelhard | .................... 210/748 |
| 5,683,576 A | * | 11/1997 | Olsen | ......................... 210/138 |
| 5,855,795 A | * | 1/1999 | Chang | ......................... 210/744 |
| 6,013,189 A | * | 1/2000 | Burris | ......................... 210/750 |
| 6,090,281 A | * | 7/2000 | Buckner | ..................... 210/205 |
| 6,139,726 A | * | 10/2000 | Greene | ......................... 210/94 |
| 6,146,524 A | * | 11/2000 | Story | ......................... 210/199 |

* cited by examiner

Primary Examiner—Frank M. Lawrence
(74) Attorney, Agent, or Firm—Rosenberg, Klein & Lee

(57) ABSTRACT

A reservoir for a water filtering system includes a tank having a separate board to define an upper space and a lower space in the tank. A water level control system is connected to the tank and located in the upper space to control the volume of the filtered water entering the upper space. An aperture is defined through the separate board and a pipe connected between the aperture and a pump so that filtered water is pumped from an outlet defined through a wall of the tank to a faucet via a pipe. A water quality improvement device is received in the upper space of the tank to ensure the quality of the filtered water in the tank.

9 Claims, 10 Drawing Sheets

RESERVOIR FOR REVERSE OSMOSIS TYPE WATER FILTERING SYSTEM

FIELD OF THE INVENTION

The present invention relates to a reservoir for a reverse osmosis type water filtering system and the reservoir is connected with a pump and a float control system so as to provide clean water more efficiently.

BACKGROUND OF THE INVENTION

A conventional reverse osmosis type water filtering system is shown in FIGS. 1 and 2 and generally includes a plurality of filters 10 through which the pipe water is provided and the water is filtered to be clean water and then is sent to a reservoir 20 which is shown in FIG. 3. The filtered water in the reservoir 20 can be provided via a faucet 30 by difference of pressure in the reservoir 20. The reservoir 20 is a metal tank 21 and a rubber made film 22 is located in the tank 21 so as to separate the interior of the tank 21 into an upper space and a lower space. An air inlet 23 is connected to a compressor so as to maintain a predetermined pressure in the lower space and an water outlet 24 is connected to a top of the tank 21 so as to deliver the filtered water to the faucet 30. When the switch of the faucet 30 is pushed, a pressure difference is formed in the tank 21 and the water in the upper space is pushed by the flexible rubber made film 22 via the water outlet 24. The metal tank 21 could be rusted after a long period of time of use and the rubber made film 22 could be slightly damaged become sticky at its surface and small particles of the rubber are spread in the filtered water. The rubber made film 22 is adhered to the inside of the tank 21 and could be broken after being applied by stress which is resulted from the deformation of the film 22. Once the seal between the rubber made film 22 and the inside of the tank 21 is destroyed, the compressor has to work informally to maintain the pressure in the lower space.

The present invention intends to provide a water filtering system that has a pump for pumping the clean water and a float control system controls the volume of the entry of the clean water in the tank for storing the clean water.

SUMMARY OF THE INVENTION

In accordance with one aspect of the present invention, there is provided a reservoir for a water filtering system which includes filters provided with pipe water so as to generate filtered water which is sent to the reservoir. The reservoir is a tank having a separate board so as to define an upper space and a lower space in the tank. A water level control system is connected to the tank and located in the upper space so as to control the volume of the filtered water entering the upper space. An aperture is defined through the separate board and a pipe is connected between the aperture and a pump. An outlet defined through a wall of the tank and a pipe connected with the pump is engaged with the outlet and adapted to be connected to a faucet. A low level control device is connected to the separate board so as to shut off the pump at a predetermined level of the filtered water. A water quality improvement device is received in the upper space of the tank.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
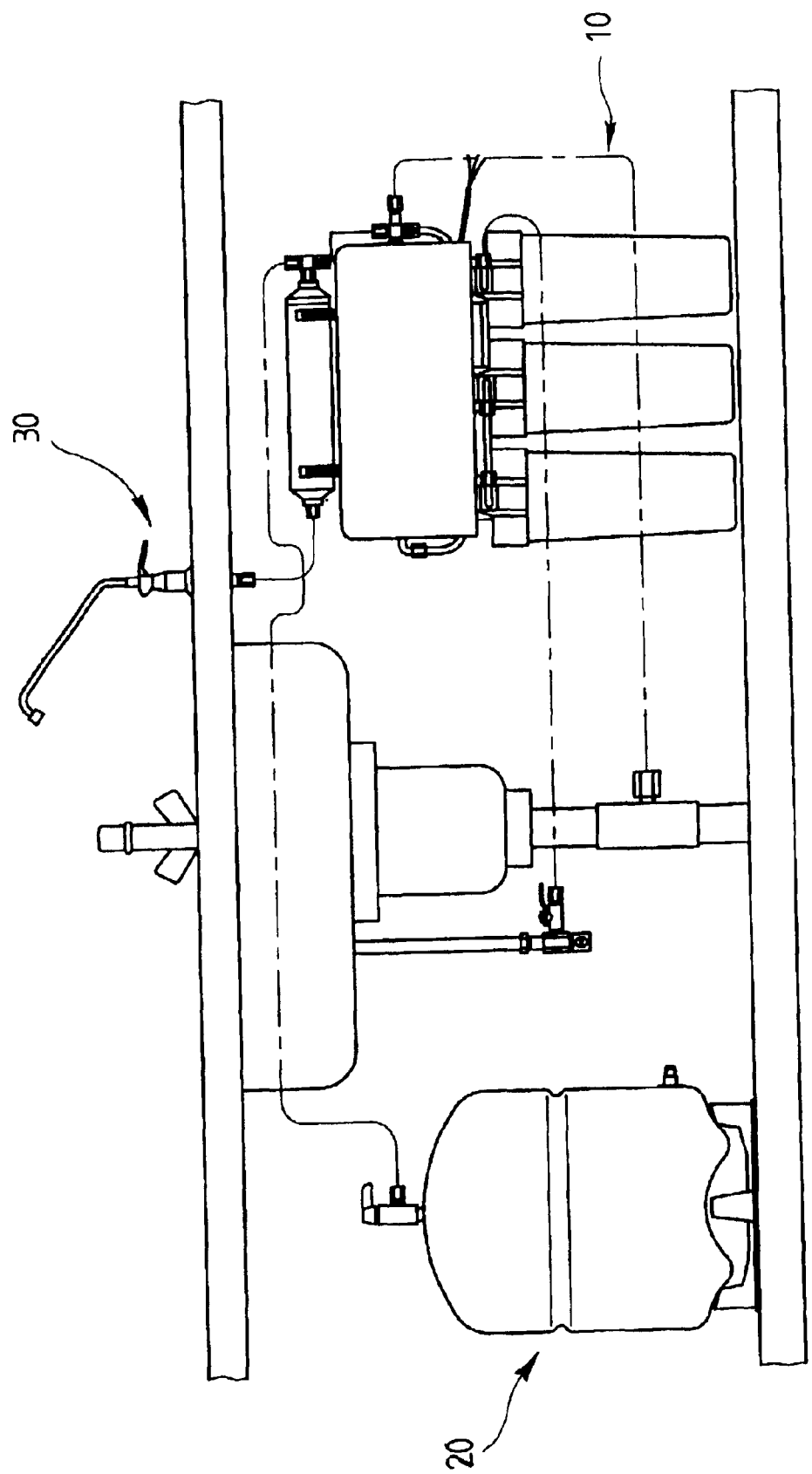
FIG. 1 shows a conventional reverse osmosis water filtering system.
Figure 10:
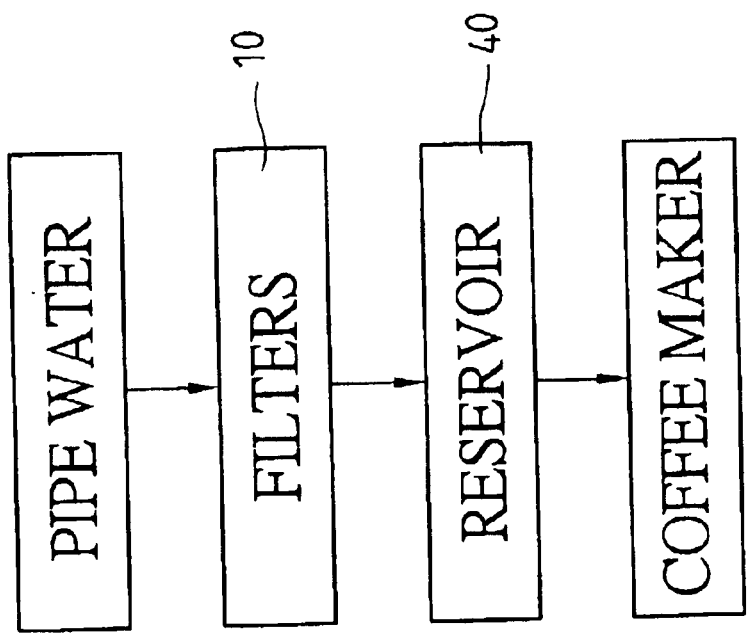
FIG. 10 shows a coffee maker is connected to the water filtering system of the present invention.
Figure 2:
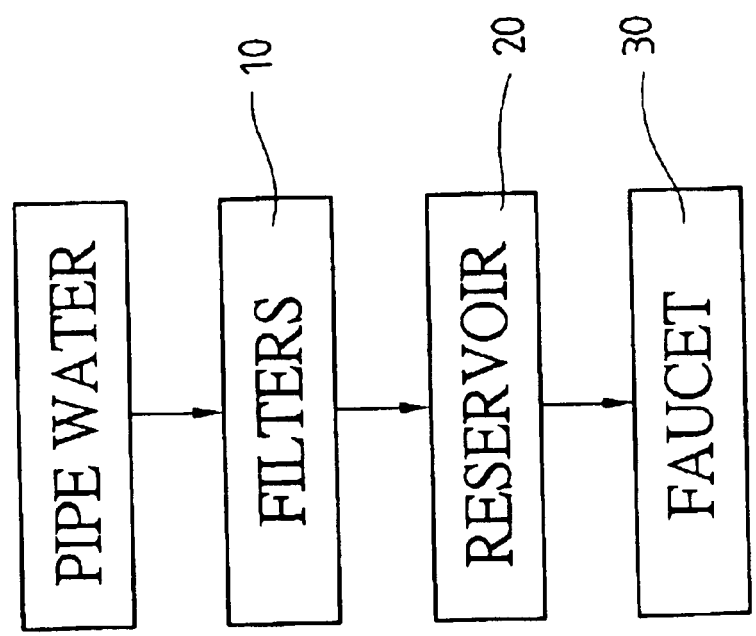
FIG. 2 is a flow chart to show the water to be filtered in the conventional reverse osmosis water filtering system.
Figure 3:
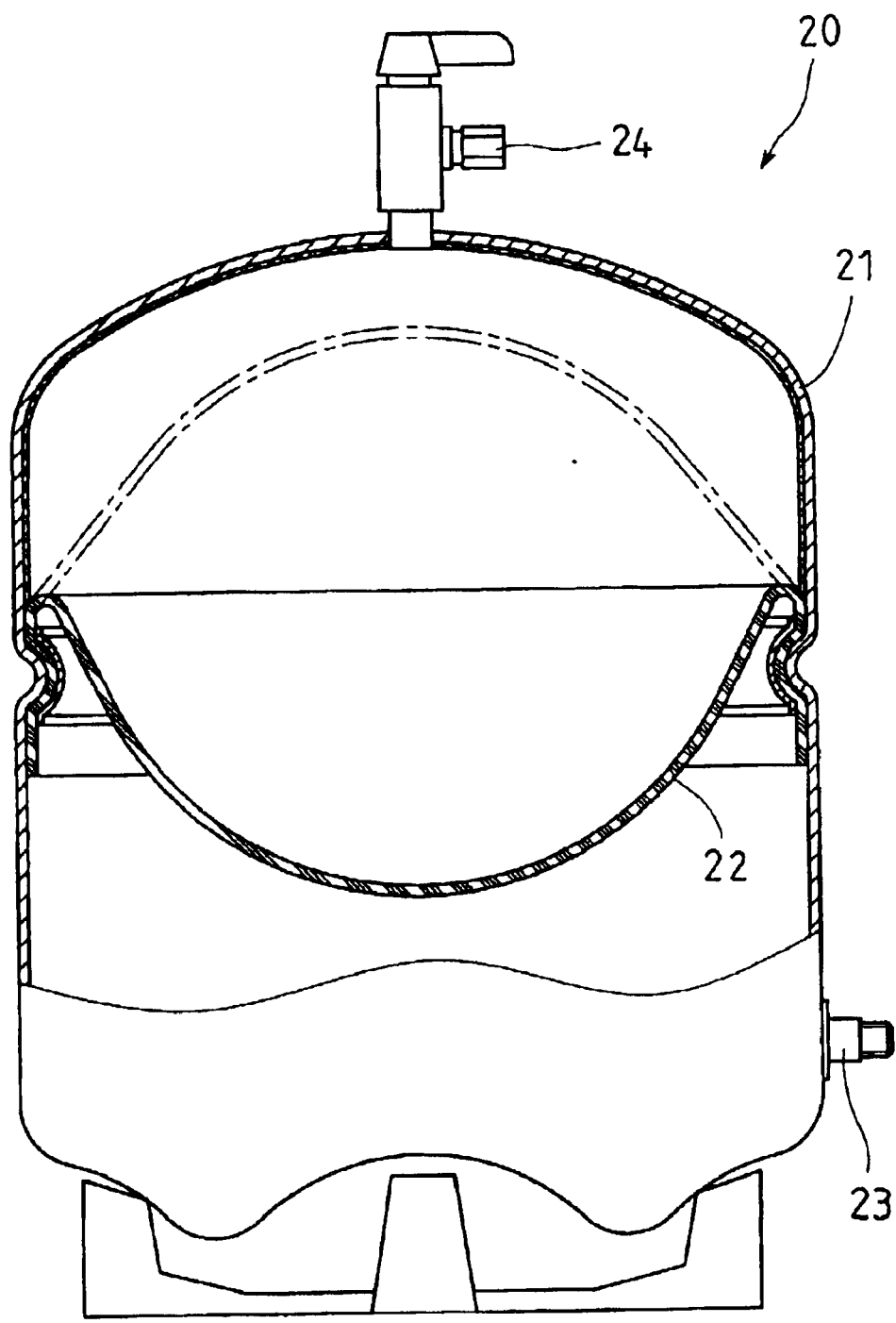
FIG. 3 shows a rubber made film is connected to an inside of the tank of the conventional reverse osmosis water filtering system.
Figure 4:
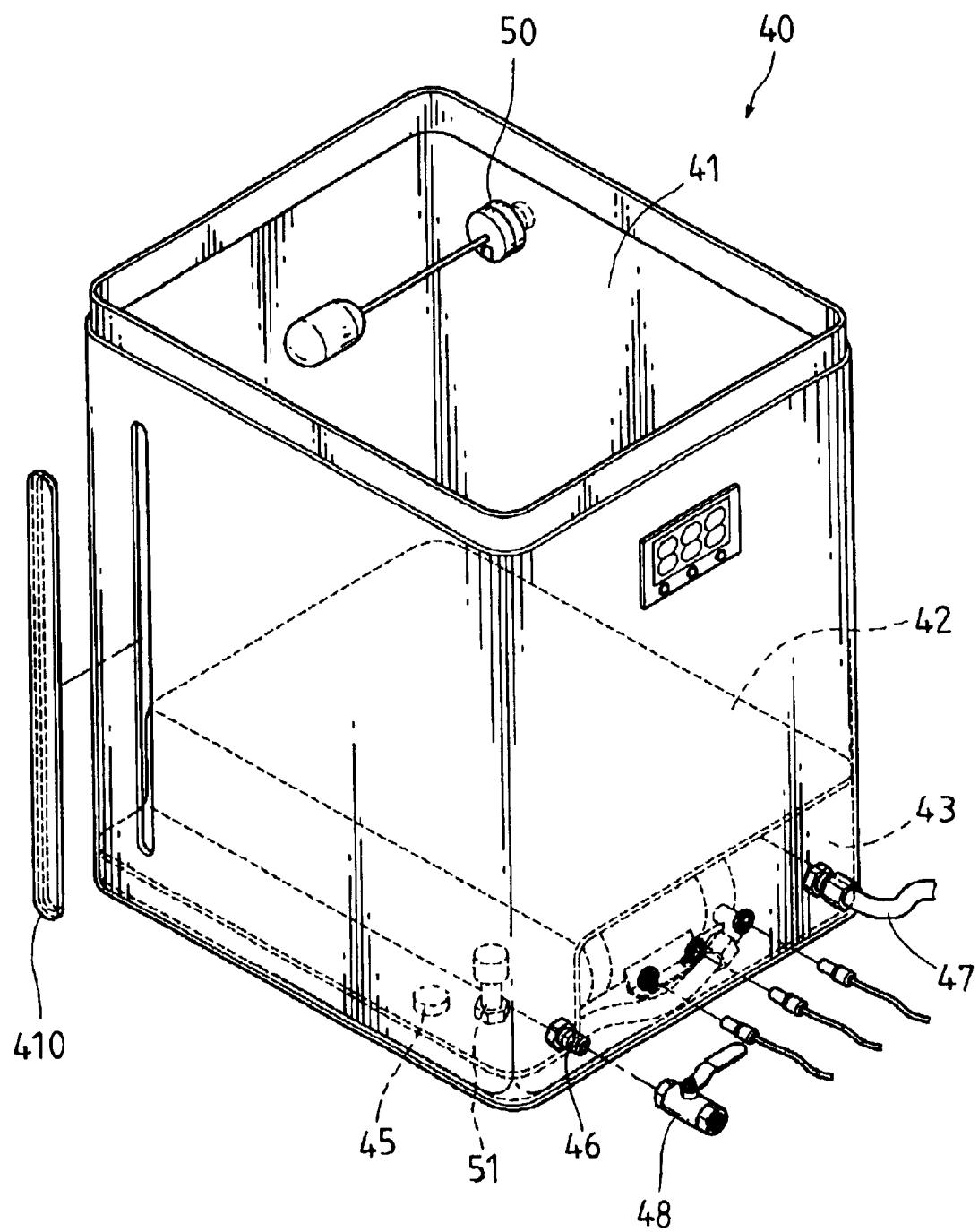
FIG. 4 shows the tank of the water filtering system of the present invention.
Figure 5:
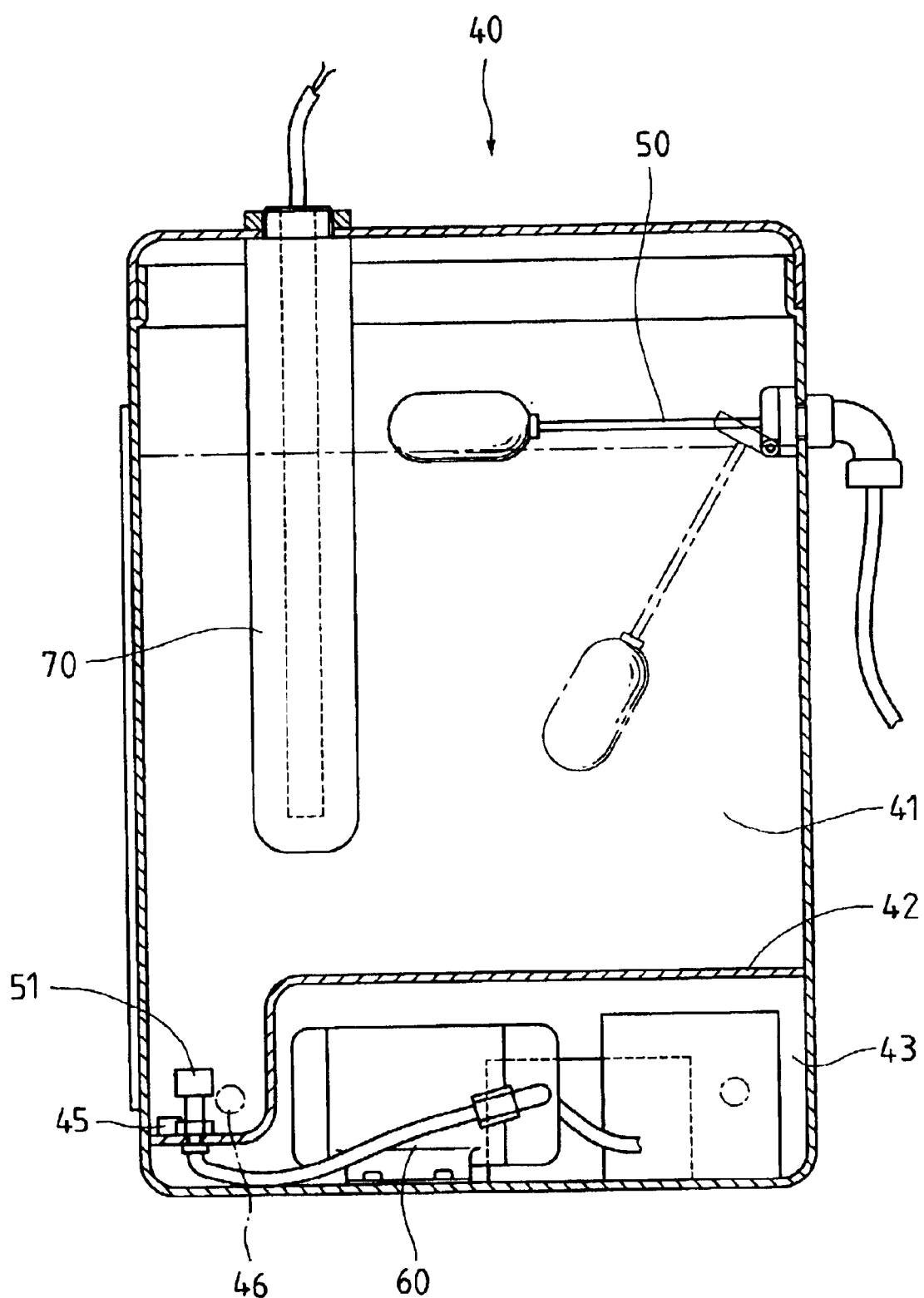
FIG. 5 is a cross sectional view to show the tank of the water filtering system of the present invention.
Figure 6:
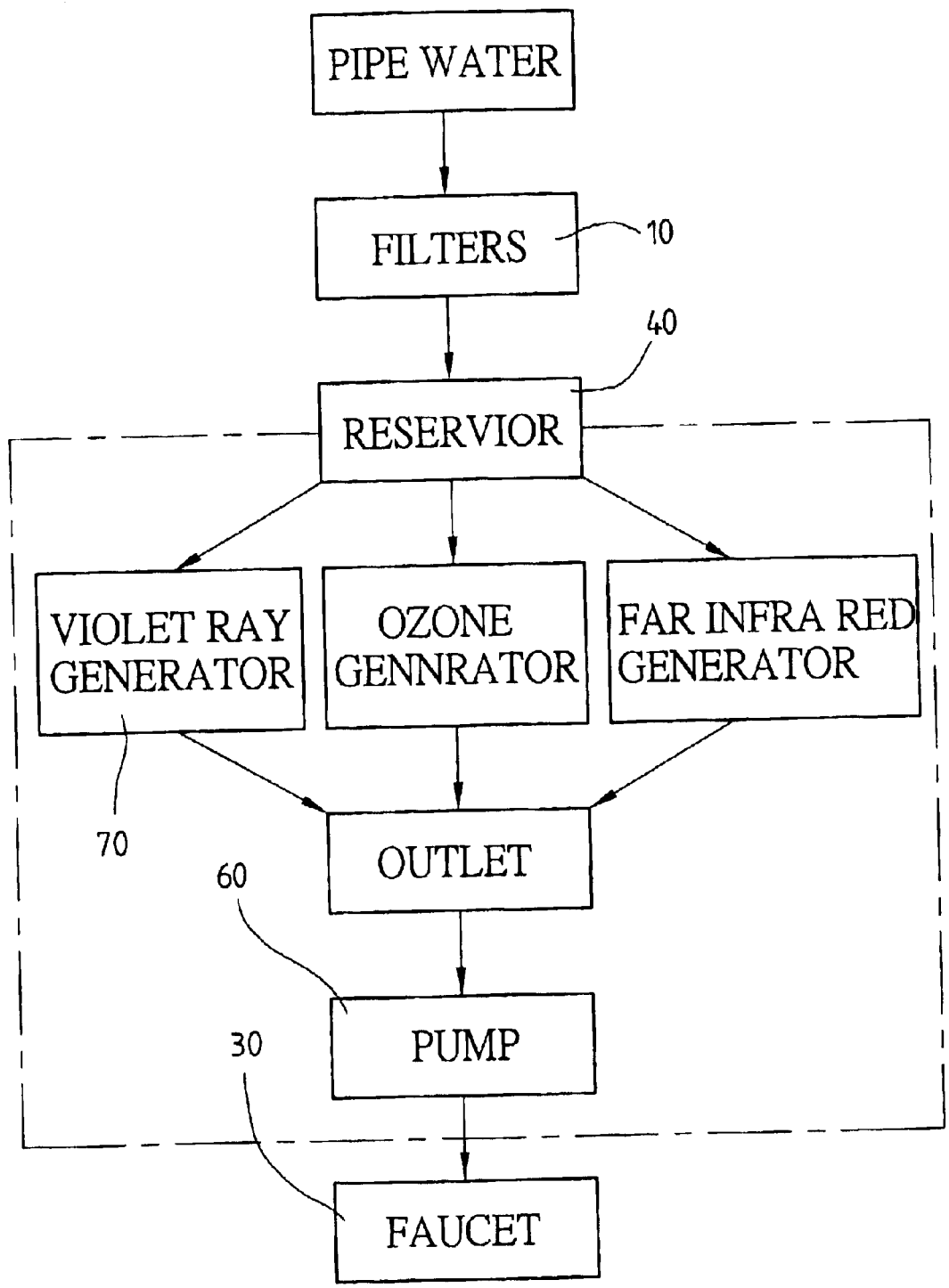
FIG. 6 shows a flow chart of the water to be filtered in the water filtering system of the present invention.
Figure 7:
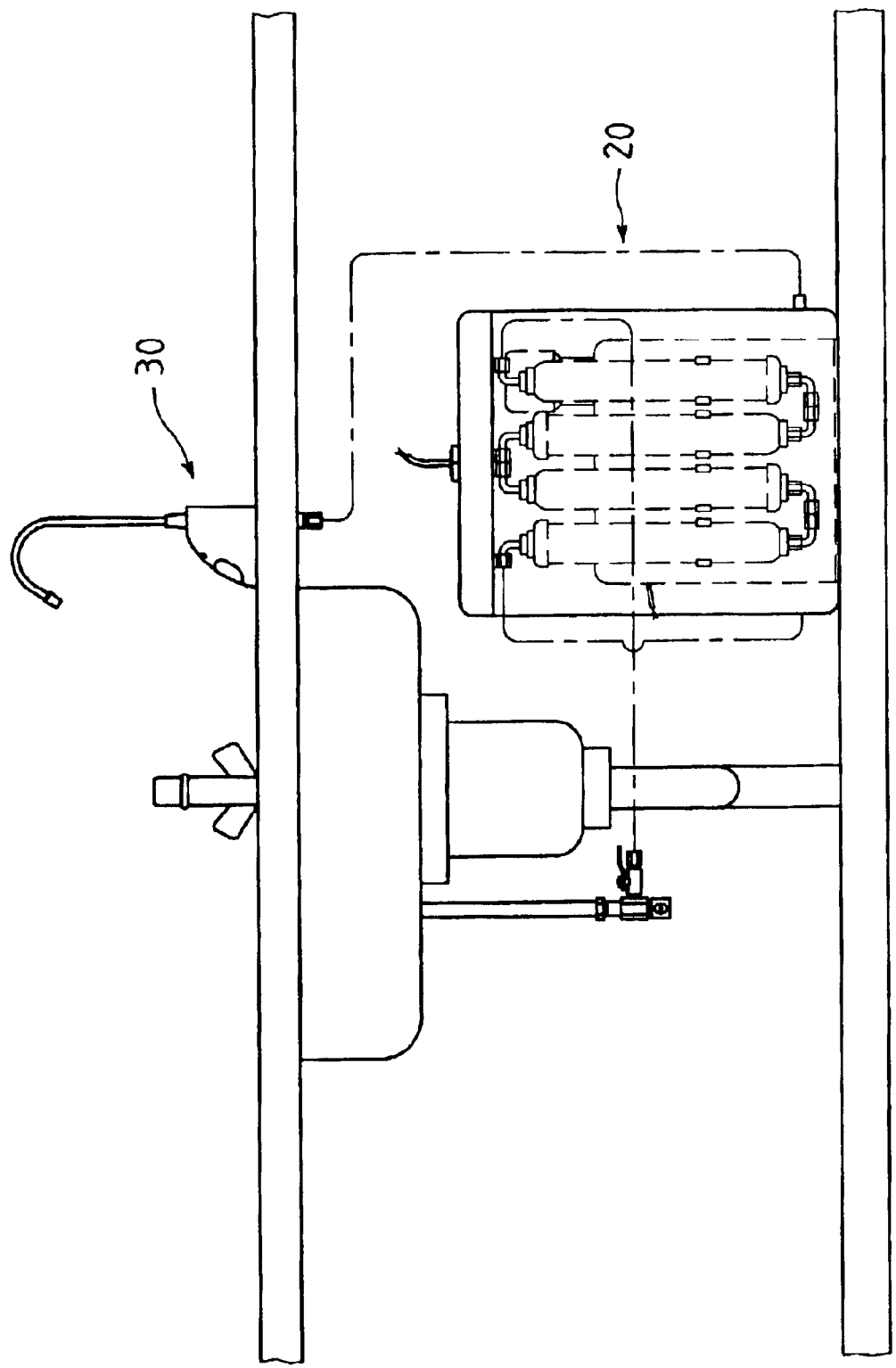
FIG. 7 shows that the tank of the present invention is installed beneath the water sink.
Figure 8:
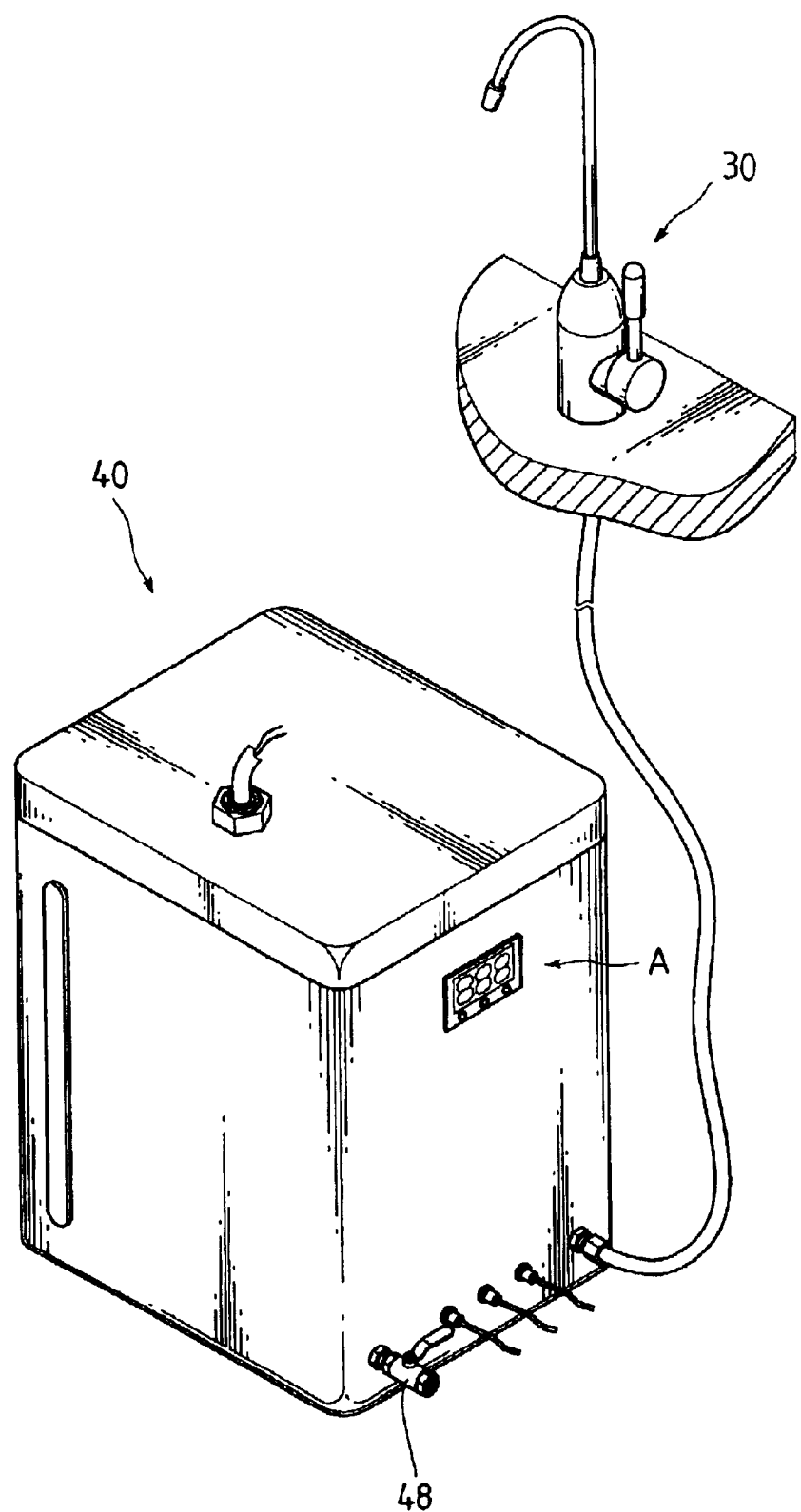
FIG. 8 shows the mechanical faucet cooperated with the water filtering system of the present invention.
Figure 9:
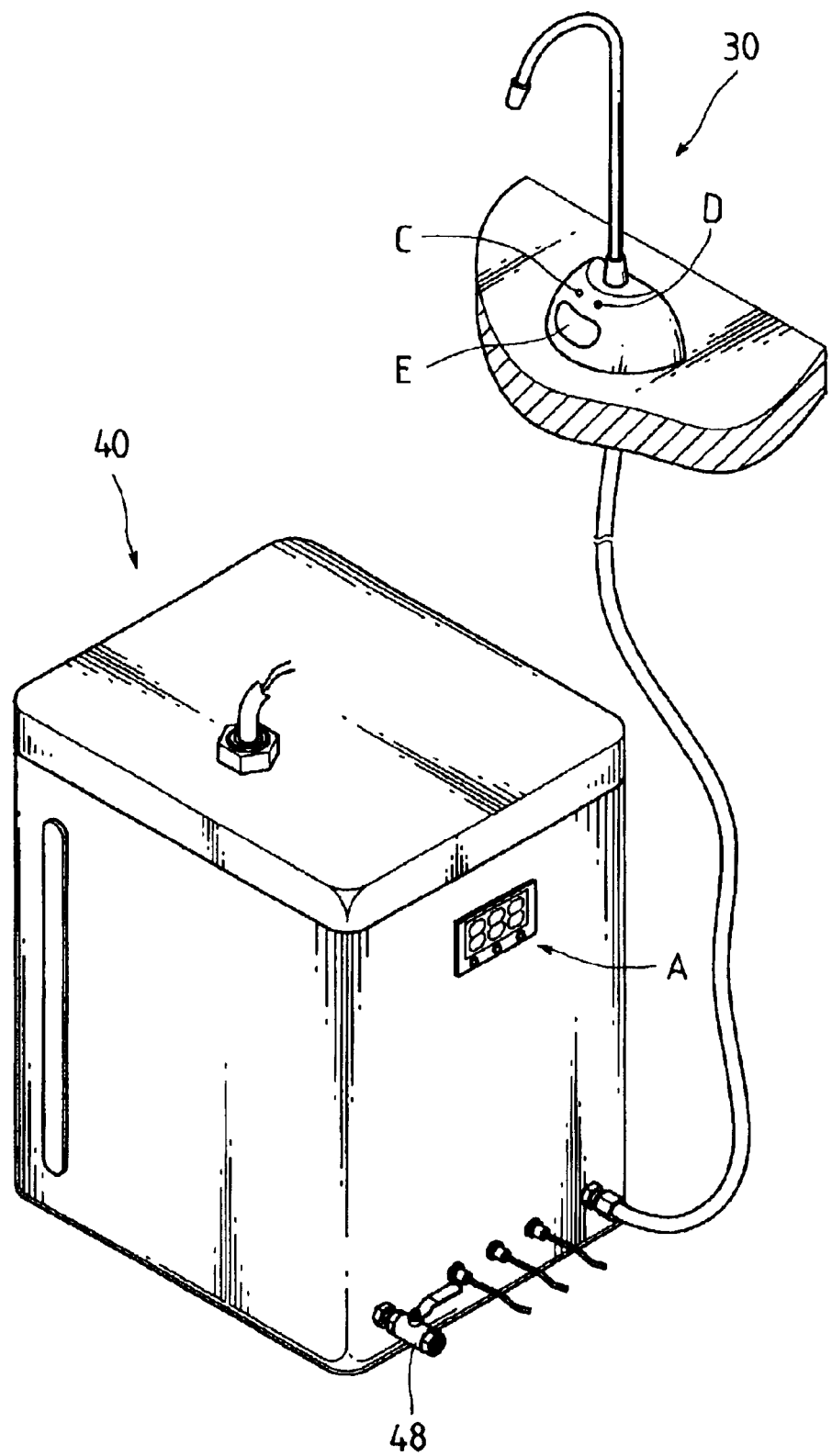
FIG. 9 shows the sensor type faucet cooperated with the water filtering system of the present invention.

Referring to FIGS. 4 and 5, the water filtering system includes known types of filters such as shown in FIG. 10, and pipe water is sent into the filters so as to generate filtered water which is sent to the reservoir 40. The reservoir 40 of the present invention is a tank having a separate board 42 received therein so as to define an upper space 41 and a lower space 43 in the tank. A water level control system 50 including a float connected to an activation rod is connected to the tank and located in the upper space 41 so as to control the volume of the filtered water entering the upper space 41. A window is defined through a wall of the tank and a transparent piece 410 is engaged with the window so as to check the water level in the upper space 41. An aperture 45 is defined through the separate board 42 and a pipe is connected between the aperture 45 and a pump 60. An outlet is defined through a wall of the tank and a pipe 47 connected with the pump is engaged with the outlet, and is extended to be connected to a faucet 30 such that the filtered water can be pumped to the faucet 30 as shown in FIGS. 7 to 9. The faucet 30 can be a mechanical faucet as shown in FIG. 8, or an infra red control faucet as shown in FIG. 9. The faucet 30 in FIG. 9 includes a base with a indication light "D", a sensor "C" and an activation switch "E". A clean hole 46 is defined through a wall of the tank and communicates with the upper space 41 of the tank. A pipe 48 is connected to the clean hole 46 so as to drain the water in the upper space 41 when cleaning the inside of the tank.

A low water level control device 51 is connected to the separate board 42 so as to shut off the pump 60 at a predetermined level of the filtered water and to protect the pump 60.

A water quality improvement device 70 is received in the upper space 41 of the tank to further ensure the quality of the filtered water. The water quality improvement device 70 can be a far infra red generator, an ozone generator or a violet ray generator. A water quality detection panel "A" as shown in FIG. 9 is connected to a side of the tank such that the user may check the water.

Figure 11:
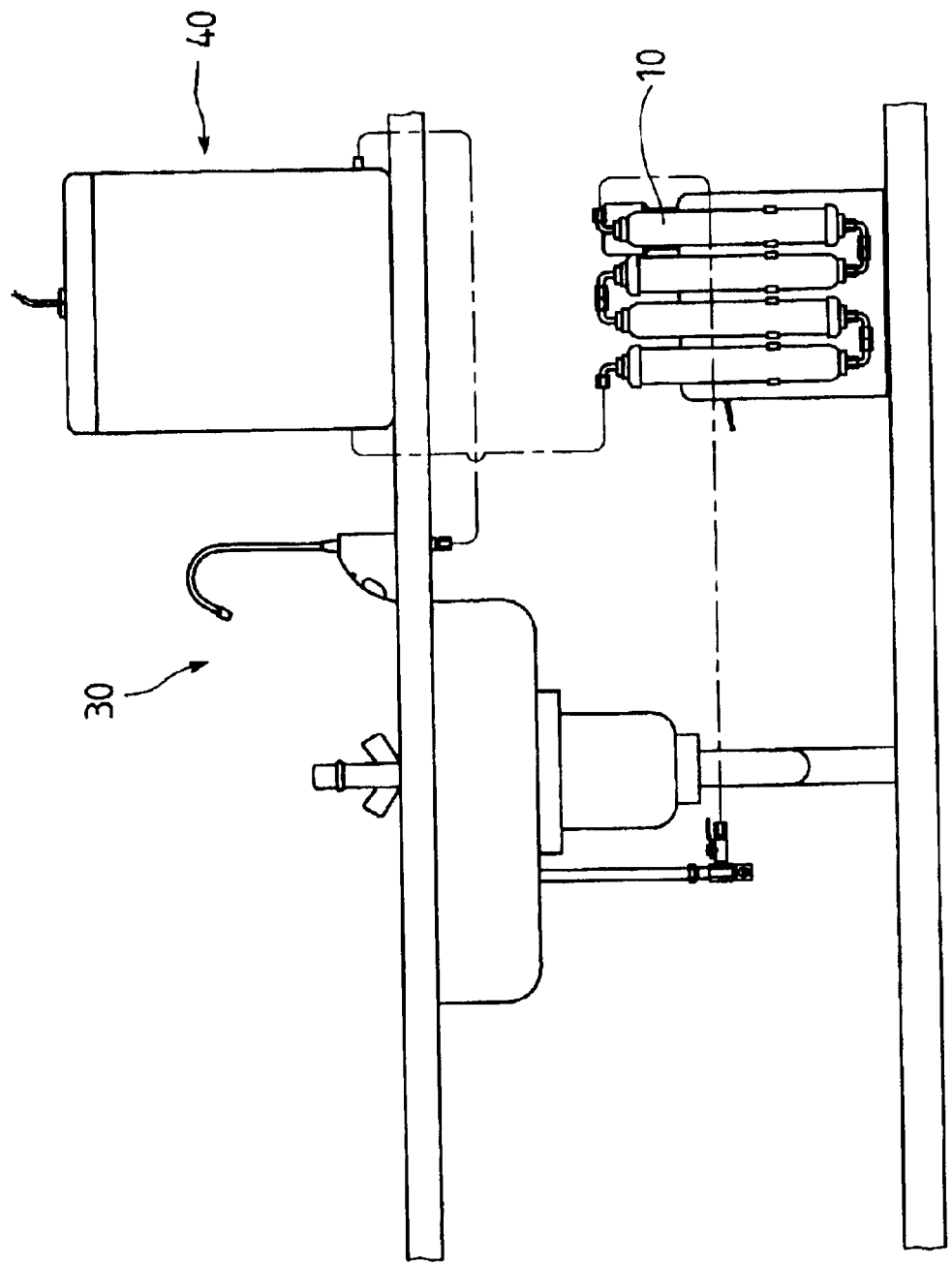
FIG. 11 shows that the tank of the present invention is put on a top of the counter.

The tank of the present invention can be installed beneath the water sink as shown in FIG. 7 or on the top counter as shown in FIG. 11. As shown in FIG. 10, a coffee maker is connected to the tank. In other words, the water for making coffee is the filtered water from the water filtering system.

While we have shown and described the embodiment in accordance with the present invention, it should be clear to those skilled in the art that further embodiments may be made without departing from the scope of the present invention.

What is claimed is:

1. A reservoir for a water filtering system which includes filters provided with pipe water so as to generate filtered water which is sent to the reservoir, the reservoir comprising:

a tank having a separate board (42) received therein so as to define an upper space (41) and a lower space (43) in the tank, a water level control system (50) connected to the tank and located in the upper space (41) so as to control the volume of the filtered water entering the upper space (41), an aperture (45) defined through the separate board (42) and a pipe connected between the aperture (45) and a pump (60), an outlet defined through a wall of the tank and a pipe (47) connected with the pump and engaged with the outlet and adapted to be connected to a faucet (30), a low water level control device (51) connected to the separate board (42) so as to shut off the pump (60) at a predetermined level of the filtered water, and a water quality improvement device (70) is received in the upper space (41) of the tank.

2. The reservoir as claimed in claim 1 further comprising a clean hole (46) defined through a wall of the tank and communicating with the upper space (41) of the tank.

3. The reservoir as claimed in claim 1, wherein the water quality improvement device (70) is a far infra red generator.

4. The reservoir as claimed in claim 1, wherein the water quality improvement device (70) is an ozone generator.

5. The reservoir as claimed in claim 1, wherein the water quality improvement device (70) is a violet ray generator.

6. The reservoir as claimed in claim 1 further comprising a window defined through a wall of the tank and a transparent piece (410) engaged with the window.

7. The reservoir as claimed in claim 1, wherein the faucet (30) is a mechanical faucet.

8. The reservoir as claimed in claim 1, wherein the faucet (30) is an infra red control faucet.

9. The reservoir as claimed in claim 1, wherein a coffee maker is connected to the tank.

* * * * *